(12) United States Patent
Sundar et al.

(10) Patent No.: US 11,823,367 B2
(45) Date of Patent: Nov. 21, 2023

(54) SCALABLE ACCELERATOR ARCHITECTURE FOR COMPUTING VIDEO QUALITY METRICS

(71) Applicant: Meta Platforms, Inc., Menlo Park, CA (US)

(72) Inventors: Deepa Palamadai Sundar, Sunnyvale, CA (US); Xing Cindy Chen, Los Altos, CA (US); Visalakshi Vaduganathan, Fremont, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/394,258

(22) Filed: Aug. 4, 2021

(65) Prior Publication Data

US 2022/0046318 A1 Feb. 10, 2022

Related U.S. Application Data

(60) Provisional application No. 63/061,692, filed on Aug. 5, 2020.

(51) Int. Cl.
*H04N 21/44* (2011.01)
*G06T 7/00* (2017.01)
(Continued)

(52) U.S. Cl.
CPC ........ *G06T 7/0002* (2013.01); *G06F 12/0875* (2013.01); *G06F 12/0897* (2013.01);
(Continued)

(58) Field of Classification Search
CPC ......... G06T 7/0002; G06T 2207/10016; G06T 2207/30168; G06F 12/0875;
(Continued)

(56) References Cited

U.S. PATENT DOCUMENTS 6,262,748 B1 7/2001 Deering et al.
9,325,985 B2 4/2016 Kolarov et al.
(Continued)

FOREIGN PATENT DOCUMENTS

CN 111432207 11/2020
WO 2012122209 9/2012

OTHER PUBLICATIONS

Cacciotti M., et al., "Hardware Acceleration of HDR-Image Tone Mapping on an FPGA-CPU platform through High-Level Synthesis," 31st IEEE International System-on-Chip Conference (SOCC), 2018, 5 pages.
(Continued)

*Primary Examiner* — Susan E. Torgerson
(74) *Attorney, Agent, or Firm* — Van Pelt, Yi & James LLP

(57) ABSTRACT

A scalable hardware accelerator configured to compute video quality metrics is disclosed. In some embodiments, an accelerator for video quality metrics comprises an application-specific integrated circuit that includes a buffer memory configured to store at least a portion of a reference frame of a video and at least a corresponding portion of a distorted frame of a transcoded version of the video and that includes a processing unit configured to receive data from the buffer memory and compute a perception-based video quality metric for the distorted frame with respect to the reference frame.

20 Claims, 2 Drawing Sheets

(51) Int. Cl.
| | |
|---|---|
| *G06F 17/17* | (2006.01) |
| *H04N 19/147* | (2014.01) |
| *H04N 19/176* | (2014.01) |
| *H04N 19/36* | (2014.01) |
| *H04N 19/40* | (2014.01) |
| *H04N 19/103* | (2014.01) |
| *H04N 19/117* | (2014.01) |
| *H04N 19/182* | (2014.01) |
| *H04N 19/523* | (2014.01) |
| *G06F 12/0875* | (2016.01) |
| *G06F 12/0897* | (2016.01) |

(52) U.S. Cl.
CPC ........... *G06F 17/17* (2013.01); *H04N 19/103* (2014.11); *H04N 19/117* (2014.11); *H04N 19/147* (2014.11); *H04N 19/176* (2014.11); *H04N 19/182* (2014.11); *H04N 19/36* (2014.11); *H04N 19/40* (2014.11); *H04N 19/523* (2014.11); *H04N 21/44008* (2013.01); *G06T 2207/10016* (2013.01); *G06T 2207/30168* (2013.01)

(58) Field of Classification Search
CPC ... G06F 12/0897; G06F 17/17; H04N 19/103; H04N 19/117; H04N 19/147; H04N 19/176; H04N 19/182; H04N 19/36; H04N 19/40; H04N 19/523; H04N 21/44008; H04N 19/423; H04N 19/154
USPC ......................................................... 386/263
See application file for complete search history.

(56) References Cited

U.S. PATENT DOCUMENTS

| | | | |
|---|---|---|---|
| 10,516,833 | B2 | 12/2019 | Zhu et al. |
| 10,699,396 | B2* | 6/2020 | Aydin ..................... H04N 19/00 |
| 11,089,359 | B1* | 8/2021 | Katsavounidis ... H04N 21/4621 |
| 2008/0028151 | A1 | 1/2008 | Hino |
| 2010/0092100 | A1* | 4/2010 | Madnani ................. G06T 5/003 382/255 |
| 2010/0149202 | A1 | 6/2010 | Yoshikawa |
| 2010/0253694 | A1 | 10/2010 | Kambegawa |
| 2012/0233405 | A1 | 9/2012 | Budagavi |
| 2015/0113027 | A1 | 4/2015 | Chen et al. |
| 2017/0150158 | A1 | 5/2017 | Jacobson et al. |
| 2017/0154415 | A1 | 6/2017 | Aydin et al. |
| 2017/0270632 | A1 | 9/2017 | Kee et al. |
| 2018/0060278 | A1 | 3/2018 | Lin et al. |
| 2019/0035047 | A1* | 1/2019 | Lim ................... H04N 5/23212 |
| 2019/0190976 | A1* | 6/2019 | Chen ............... H04N 21/23418 |
| 2019/0377548 | A1 | 12/2019 | Matsuyama |
| 2020/0126263 | A1* | 4/2020 | Dinh ...................... G06V 10/82 |

OTHER PUBLICATIONS

Deng S., et al., "VMAF Based Rate-Distortion Optimization for Video Coding," IEEE 22nd International Workshop on Multimedia Signal Processing (MMSP), 2020, 6 pages.

Guo J., et al., "VLSI Architecture of Wavelet Transform Based on Basic Lifting Elements," Proceedings of SPIE, Aug. 31, 2009, vol. 7455, pp. 74550E-1-74550E-9.

International Search Report and Written Opinion for International Application No. PCT/US2021/044621,dated Nov. 24, 2021, 12 pages.

Liu T., et al., "Real-Time Video Quality Monitoring," EURASIP Journal on Advances in Signal Processing, 2011, 2011:122, 18 pages.

Mittal S., "A Survey of Techniques for Approximate Computing," ACM Computing Surveys, Mar. 2016, vol. 48, No. 4, Article 62, pp. 62:1-62:33.

Moschetti F., "A Statistical Approach to Motion Estimation," Ecole Polytechnique Federale De Lausanne (EPFL), 2001, 153 pages.

Moschetti F., et al., "A Statistical Adaptive Block-Matching Motion Estimation," IEEE Transactions on Circuits and Systems for Video Technology, vol. 13, No. 4, Apr. 2003, pp. 417-431.

Ndour G., et al., "Evaluation of Variable Bit-Width Units in a RISC-V Processor for Approximate Computing," Proceedings of the 16th ACM International Conference on Computing Frontiers, Apr. 2019, 7 pages.

Rezazadeh S., et al., "Low-Complexity Computation of Visual Information Fidelity in the Discrete Wavelet Domain," 2010 IEEE International Conference on Acoustics, Speech and Signal Processing, 2010, pp. 2438-2441.

Shingala., et al., "Energy Efficient Perceptual Video Quality Measurement (VMAF) at Scale," Proceedings of SPIE, Applications of Digital Image Processing XLIII, vol. 11510, Aug. 21, 2020, 9 pages.

Sundar D.P., et al., "Hardware Acceleration of Video Quality Metrics," Applications of Digital Image Processing XLIII, vol. 11510, Aug. 21, 2020, 9 pages.

Tran H.T.T., et al., "A Study on Quality Metrics for 360 Video Communications," IEICE Transactions on Information and Systems, Jan. 2018, vol. E101-D, No. 1, pp. 28-36.

Tvrdik P., et al., "A New Diagonal Blocking Format and Model of Cache Behavior for Sparse Matrices," Parallel Processing and Applied Mathematics (PPAM), 2005, pp. 164-171.

Wan P., et al., "Using Diagonal and Horizontal Vertical Sobel Operators Spam Detection," Third International Conference on Intelligent Networking and Collaborative Systems, 2011, pp. 396-400.

Wielgosz M., et al., "FPGA Implementation of Procedures for Video Quality Assessment," Computer Science, 2018, vol. 19, No. 3, pp. 279-305.

Xilinx: "AXI Video Direct Memory Access v6.3: LogiCORE IP Product Guide," Vivado Design Suite PG020, Oct. 4, 2017, 90 pages.

Xu Y., et al., "Fast Implementation of Image Structural Similarity Algorithm," IOP Conference Series: Materials Science and Engineering, 2019, vol. 533, 7 pages.

Zhang Y., et al., "A Subjective Quality Assessment Database for Mobile Video Coding," IEEE Conference on Multimedia Information Processing and Retrieval (MIPR), 2020, pp. 225-228.

Zhong X., et al., "Efficient Lifting Based CDF9/7 Wavelet Transform Using Fixed Point," 3rd International Congress on Image and Signal Processing, 2010, pp. 3094-3097.

ZIPcores: "XY_SCALER Digital Video Scaler IP Core," 2017, Rev. 3.0, 6 pages.

International Preliminary Report on Patentability for International Application No. PCT/US2021/044621, dated Feb. 16, 2023, 10 pages.

* cited by examiner

SCALABLE ACCELERATOR ARCHITECTURE FOR COMPUTING VIDEO QUALITY METRICS

CROSS REFERENCE TO OTHER APPLICATIONS

This application claims priority to U.S. Provisional Patent Application No. 63/061,692 entitled HARDWARE ACCELERATION OF VIDEO QUALITY METRICS filed Aug. 5, 2020 which is incorporated herein by reference for all purposes.

BACKGROUND OF THE INVENTION

Video transcoding systems rely on video quality metrics for determining optimal video resolutions to serve to end user devices. Video quality metrics in existing video transcoding systems have mostly been implemented in software and have been limited to less computationally complex algorithms so that system resources are not overburdened. Thus, there exists a need for techniques to energy efficiently compute complex video quality metrics in video transcoding systems that provide better measures of transcoded video quality at low power.

BRIEF DESCRIPTION OF THE DRAWINGS

Various embodiments of the invention are disclosed in the following detailed description and the accompanying drawings.

DETAILED DESCRIPTION

Figure 1:
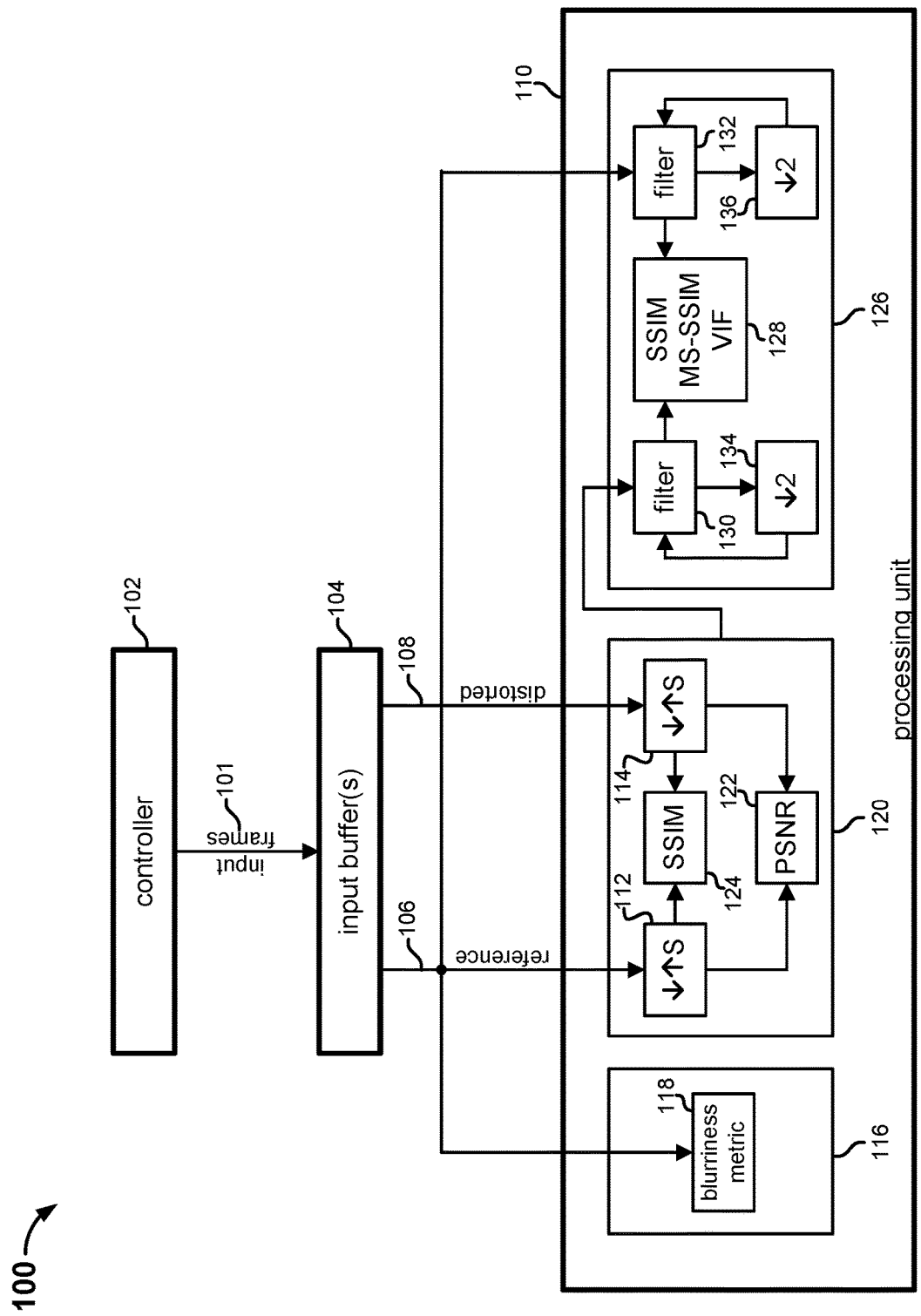
FIG. 1 is a high level block diagram illustrating an embodiment of an accelerator architecture for accelerating computations of objective video quality metrics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

With the advancement of digital media and growing demand for video content, video transcoding has become a common operation in data centers. Generally, video transcoding is the process of generating multiple versions of the same video in different resolutions or sizes. More specifically, a video transcoder typically comprises processing steps including receiving an input video, decoding the input video, and re-encoding the decoded input video into a plurality of qualities or resolutions (e.g., 360p, 480p, 720p, 1080p, 4K, etc.) that are persisted server-side so that optimal versions of the video may be selected and provided to different devices based on corresponding viewport sizes and/or available communication bandwidths. Transcoding an input video into a prescribed resolution may result in some quality loss in the resulting encoded video having the prescribed resolution. Moreover, scaling the encoded video having the prescribed resolution to different viewport sizes may result in further quality loss.

Quality metrics comprise a manner for measuring or quantifying quality losses resulting from transcoding an input video into an encoded video having a prescribed resolution and/or from scaling the encoded video having the prescribed resolution to a prescribed viewport size. Video transcoding applications rely on quality metrics to select an optimal version of a video for an end user device based on current capabilities of the device for receiving and displaying the video. Thus, quality metrics are determined for each of a plurality of encoded video resolutions for each of a plurality of viewport resolutions so that corresponding quality scores may be employed to select and provide an appropriate version of a video to an end user device.

Quality metrics may generally be divided into two categories—subjective quality metrics and objective quality metrics. Subjective quality metrics are determined via human test subjects, e.g., by asking users for their ratings or scores. Objective quality metrics are determined via mathematical models that facilitate computation of corresponding quality scores or values. For example, Peak Signal-to-Noise Ratio (PSNR) comprises a simple computation based on summing squared errors that has widely been used as an objective pixel quality metric. While subjective quality metrics provide better measures of true perceptual quality, determining such metrics is not scalable or even feasible for most applications. As such, several perception-based objective quality metrics have been proposed in recent years that have been correlated to human perception during testing and have evolved to closely represent subjective video quality. Examples of such perception-based objective quality metrics include Structural Similarity Index Measure (SSIM), Multi-Scale SSIM (MS-SSIM), Visual Information Fidelity (VIF), Video Multimethod Assessment Fusion (VMAF), Detail Loss Metric (DLM), etc.

Objective quality metrics are very resource intensive since computations are performed for each pixel for each frame of a video. Moreover, computational complexity increases with increasing resolutions since computations have to be performed for more pixels. Furthermore, live applications require dynamic computations of quality metrics in real time that need to be performed without introducing significant latency. Objective quality metrics have traditionally been implemented in software, and typically only less computationally complex metrics (such as PSNR and single scale SSIM) have been employed to minimize resource consumption in an associated system. However, more computationally complex objective quality metrics offer opportunities for better quality measurements that provide more accurate indications of perceived video quality. A hardware accelerator dedicated to efficiently computing objective quality metrics is disclosed herein that provides support for not only simpler objective quality metrics that have traditionally been implemented in software but also for more computationally complex emerging objective quality metrics that have been proposed in literature and limited to use cases that do not have resource and/or time constraints but that have yet to receive adoption in video transcoding systems due to heretofore introducing unacceptable resource overheads.

FIG. 1 is a high level block diagram illustrating an embodiment of an accelerator 100 for accelerating computations of objective video quality metrics. Accelerator 100 comprises an application-specific integrated circuit for computing one or more video quality metrics and supports simultaneously computing multiple video quality metrics in parallel. Various components comprising the architecture of accelerator 100 are scalable for parallel processing based on area and power budgets available with respect to an associated system. Accelerator 100 may comprise a stand-alone component or a component of a system or device. For example, accelerator 100 may comprise an independent component of a video transcoding system that offloads resource intensive video quality metrics computations from a central processing unit of the transcoding system.

A simplified block diagram of components comprising an embodiment of accelerator 100 is illustrated in FIG. 1 for the purpose of explanation. However, generally, accelerator 100 may comprise any other appropriate combination and configuration of components to achieve the described functionality. Although many of the examples described herein are with respect to computing quality metrics for frames of a transcoded video, the disclosed techniques may be employed to compute quality metrics for any type of image data comprising pixels.

Video quality measurements may be categorized into full reference metrics, partial reference metrics, and no reference metrics. For a full reference metric, a complete reference image is available to compute distorted image quality. For a partial reference metric, partial information of a reference image such as a set of associated parameters is available to compute distorted image quality. For a no reference metric, no reference image is available, and the metric is used to establish source or upload quality. An accelerator for computing video quality metrics may generally be configured to support any combination of one or more full, partial, and/or no reference metrics. In the example of FIG. 1, accelerator 100 is specifically configured to support a plurality of full reference metrics as well as a no reference metric. A full reference metric comprises comparing a reference frame and a distorted frame on a per pixel or pixel block basis to predict perceptual quality of the distorted frame with respect to the reference frame. A reference frame comprises an original source frame prior to transcoding while a distorted frame comprises an encoded version of the reference frame after transcoding. A quality score is computed per pixel for a frame. Quality scores of pixels comprising a frame are accumulated or combined to generate a frame level score and/or a block level score for a portion of the frame. Block level scores may be useful in identifying regions of a frame that have higher impact on quality. Computed frame level and/or block level scores may be written to memory so that they are available to other components of an associated transcoding system. In some cases, frame level scores of frames comprising a prescribed video are later combined in an appropriate manner to generate a quality score for the video.

In FIG. 1, controller 102 of accelerator 100 facilitates obtaining input video frame data 101. More specifically, controller 102 of accelerator 100 facilitates obtaining frame data 101 from memory or from one or more intermediary components thereof. For example, in one embodiment, controller 102 communicates, e.g., via a double data rate (DDR) channel, with a direct memory access (DMA) interface that interfaces with physical memory. Controller 102 facilitates reading both reference frame data and distorted frame data from memory. Controller 102 furthermore coordinates or synchronizes reads of reference and distorted frame pairs to ensure that read portions of both frames are spatially aligned when input into accelerator 100 so that reference and distorted frame pairs can later be processed on a pixel by pixel basis when computing video quality metrics. Generally, optimally reading data from memory is desirable since memory bandwidth in an associated system is both a limited and expensive resource in terms of power. By supporting computations of multiple metrics simultaneously, accelerator 100 avoids the need to read the same frame multiple times from memory for different metrics, thus more optimally utilizing both bandwidth and power in an associated system.

Read input frame data 101 is loaded into one or more local input buffers 104. In some embodiments, input buffer 104 is configured in a ping pong buffer configuration in which one buffer partition is populated with data read from memory while data comprising another buffer partition is read for processing so that memory read latency can be hidden. Frame data 101 is read from memory by controller 102 and written into input buffer 104 in units of a prescribed input block size. The block size may be based on the size of input buffer 104 and/or a bandwidth supported by a corresponding on-chip network. In some embodiments, pixel blocks comprising a frame are read from memory in a raster scan order, i.e., from left to right and from top to bottom of the frame. Moreover, pixel data comprising a frame may furthermore be decoupled into luminance (luma) and interleaved chrominance (chroma) components. Accelerator 100 may generally be configured to operate on either or both the luminance and chrominance planes, which may be segregated and processed by accelerator 100 in a prescribed order and/or which may be processed in multiple passes by accelerator 100 with each plane read and processed separately.

Reference frame data 106 and distorted frame data 108 stored in buffer memory 104 are read by and input into processing unit 110. That is, a portion of reference frame 106 and a corresponding portion of distorted frame 108 that each comprise a prescribed processing block size are input into processing unit 110 for processing. Processing unit 110 comprises the core processing kernel of accelerator 100. Processing unit 110 is configured to compute a plurality of video quality metrics or scores based on input frame pixel data. More specifically, processing unit 110 is configured to compute a plurality of different perception-based video quality metrics for distorted frame 108 with respect to reference frame 106. Furthermore, processing unit 110 may be configured to compute one or more other types of video quality metrics such as a PSNR metric for distorted frame 108 with respect to reference frame 106 and/or a no reference metric for reference frame 106 that indicates source or upload quality prior to transcoding. In some embodiments, processing unit 110 is configured to simultaneously compute a plurality of video quality metrics in parallel. For example, in one embodiment, processing unit 110 is configured to simultaneously compute up to three video quality metrics including a no reference quality metric, a PSNR metric, and one of a plurality of supported perception-based video quality metrics. In such cases, a selected one of a plurality of supported perception-based video quality metrics that processing unit 110 is currently configured to compute may be specified via a programming interface associated with accelerator 100. Generally, accelerator 100 may be dynamically programmed to compute any one or more supported video quality metrics and may be programmed differently for different input frames.

Video quality metrics are typically determined for a plurality of different viewport resolutions for each encoded resolution. Thus, in many cases, frame data is first scaled to a desired viewport resolution, and then video quality metrics are computed on the scaled output. Processing unit 110 comprises a plurality of programmable inline scaling units for scaling reference and distorted frame data to desired resolutions prior to computing one or more video quality metrics. More specifically, processing unit 110 may comprise scaling unit 112 for scaling reference frame data 106 and scaling unit 114 for scaling distorted frame data 108. Each scaling unit may be dynamically programmed to a prescribed scaling mode (e.g., upscale, downscale, bypass) and scaling ratio or factor via an associated programming interface. Scaled outputs are not stored in memory but rather directly input into one or more processing kernels for on the fly inline computations of corresponding video quality metrics. By providing inline scaling, the architecture of accelerator 100 facilitates more efficient memory bandwidth usage in an associated system by eliminating the need to write and read scaled outputs to and from memory. Scaling units 112 and 114 may comprise any appropriate programmable scaler configurations that, for example, do not introduce any further or at least any significant quality loss during the scaling process.

Scaled frame data is processed by one or more compute kernels that are each configured to compute one or more video quality metrics. In the embodiment of FIG. 1, processing unit 110 comprises three separate hardware partitions, each with one or more kernels. The various kernels comprising processing unit 110 implement fixed point versions of the quality metrics algorithms they are configured to implement. That is, floating point operations specified with respect to the original algorithms are appropriately modified to fixed point equivalents for efficient hardware implementation. The various components comprising processing unit 110 are scalable. That is, processing unit may be extended to include any number of threads of scaling unit pairs and compute kernels so that a plurality of viewport resolutions may be computed in parallel, which effectively facilitates reducing the number of passes needed to compute scores for all viewport resolutions and, in turn, the number of times input frames need to be read from memory. Various details of the specific embodiment of processing unit 110 illustrated in FIG. 1 are next described to provide an example of a manner in which processing unit 110 may be configured. However, generally, processing unit 110 may comprise any other appropriate combination and configuration of components to achieve the described functionalities.

In the embodiment of FIG. 1, partition 116 of processing unit 110 is configured to compute a no reference metric that is used to establish source quality of an input reference frame. In the given example, kernel 118 comprising partition 116 is configured to compute a blurriness metric. Kernel 118 may comprise a plurality of stages. For example, in one embodiment, input reference frame data 106 is smoothened using a Gaussian blur filter in a first stage, the smoothened output from the first stage is input into a Sobel filter to compute pixel gradients in a second stage, and the output of the second stage is input into a third stage that determines edge width values associated with the spread of the edge of each pixel, which are then used to compute final blur scores.

Partition 120 of processing unit 110 comprises kernel 122 and kernel 124. Kernel 122 is configured to compute a PSNR (sum of squared errors) metric with respect to input reference and distorted frame data. Kernel 124 is configured to compute SSIM, for example, using an FFMPEG based algorithm, which comprises an overlapped 8×8 approximation algorithm. In SSIM, three components—luminance (L), contrast (C), and structure (S)—based on local means, standard deviations, and cross-covariance of reference and distorted frame data are computed and combined to obtain an overall similarity measure, i.e., SSIM index.

Partition 126 of processing unit 110 comprises kernel 128. Kernel 128 comprises a unified kernel configured to compute single-scale (LIBVMAF) SSIM, multi-scale SSIM, as well as VIF and may be programmed to compute any one of the aforementioned metrics for a given input frame. In partition 126, distorted and reference frame data is first filtered via filter 130 and filter 132, respectively, which in some cases comprise smoothening Gaussian blur filters. The smoothened frame data output by filters 130 and 132 is then input into kernel 128 which is configured to compute LCS values of SSIM. For single scale SSIM, e.g., that is computed using an LIBVMAF based algorithm, input pixels are sent once through kernel 128. For MS-SSIM, the smoothened outputs of both frames are sent through corresponding dyadic down samplers 134 and 136 and looped back to kernel 128 to process higher scales. This process may be iterated up to a prescribed number of times corresponding to a maximum number of scales or levels supported. The feedback paths of partition 126 facilitate reuse of the same hardware to compute all scales or levels. Kernel 128 is furthermore configured to compute VIF and supports logarithmic operations needed to compute VIF scores.

Figure 2:
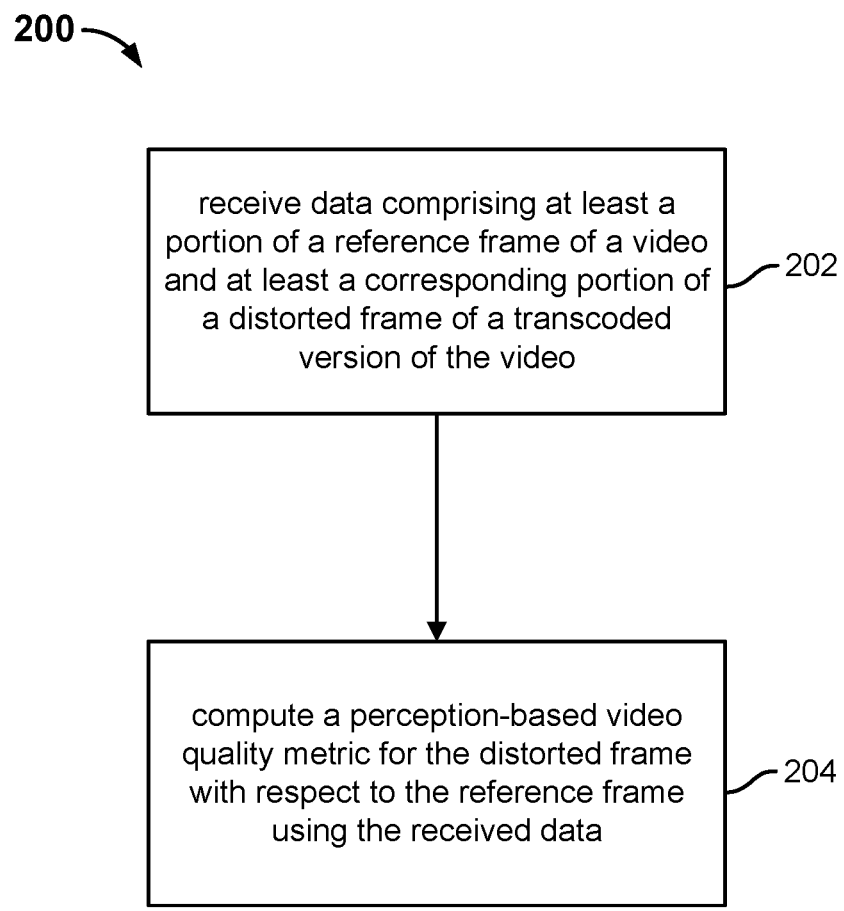
FIG. 2 is a high level flow chart illustrating an embodiment of a process for computing a video quality metric.

FIG. 2 is a high level flow chart illustrating an embodiment of a process 200 for computing a video quality metric. In some embodiments, process 200 of FIG. 2 is employed by processing unit 110 of accelerator 100 of FIG. 1. Process 200 starts at step 202 at which data comprising at least a portion of a reference frame of a video and at least a corresponding portion of a distorted frame of a transcoded version of the video is received. For example, the data is received at step 202 from a buffer memory that is populated with frame data read from an external main memory. At step 204, the data received at step 202 is used to compute a perception-based video quality metric for the distorted frame with respect to the reference frame. In some cases, step 204 comprises scaling the data received at step 202 to a prescribed viewport resolution prior to computing the perception-based video quality metric. Process 200 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system, comprising:
   a buffer memory of an application-specific integrated circuit configured to store at least a portion of a reference frame of a video and at least a corresponding portion of a distorted frame of a transcoded version of the video;
   a programming interface of the application-specific integrated circuit configured to receive a selection of one of a plurality of supported full reference, perception-based objective video quality metrics; and
   a processing unit of the application-specific integrated circuit configured to receive data from the buffer memory and simultaneously compute a plurality of video quality metrics in parallel including the selected one of the plurality of supported full reference, perception-based objective video quality metrics for the distorted frame with respect to the reference frame and a no reference video quality metric for the reference frame that indicates source quality prior to transcoding by determining pixel spread from computing pixel edge width values.

2. The system of claim 1, further comprising a controller of the application-specific integrated circuit configured to obtain reference frame data and distorted frame data from a main memory that is external to the system.

3. The system of claim 1, wherein the processing unit is further configured to scale received data from the buffer memory to a prescribed viewport resolution.

4. The system of claim 1, wherein the processing unit is further configured to simultaneously compute a Peak Signal-to-Noise Ratio (PSNR) metric for the distorted frame with respect to the reference frame in parallel.

5. The system of claim 1, wherein the no reference video quality metric comprises a blurriness metric of the reference frame.

6. The system of claim 1, wherein the processing unit is configured to compute one or more perception-based video quality metrics.

7. The system of claim 6, wherein the one or more perception-based video quality metrics comprises a Structural Similarity Index Measure (SSIM), a Multi-Scale SSIM (MS-SSIM), a Visual Information Fidelity (VIF), a Video Multimethod Assessment Fusion (VMAF), and a Detail Loss Metric (DLM).

8. The system of claim 1, wherein the processing unit is configured to simultaneously compute three video quality metrics in parallel.

9. The system of claim 1, wherein the processing unit is further configured to scale the received reference frame data using a first scaling unit and the received distorted frame data using a second scaling unit prior to computing the selected one of the plurality of supported full reference, perception-based objective video quality metrics for the distorted frame with respect to the reference frame.

10. The system of claim 1, wherein the processing unit is configured to compute a plurality of video quality metrics in parallel in real time.

11. The system of claim 1, wherein the processing unit is configured to compute a plurality of video quality metrics for different viewport resolutions.

12. The system of claim 1, wherein the computed perception-based video quality metric comprises a frame level score, one or more block level scores, or both.

13. The system of claim 1, wherein the system comprises the application-specific integrated circuit.

14. The system of claim 1, wherein the system comprises a component of a video transcoding system.

15. A method, comprising:
    receiving data from a buffer memory of an application-specific integrated circuit comprising at least a portion of a reference frame of a video and at least a corresponding portion of a distorted frame of a transcoded version of the video;
    receiving from a programming interface of the application-specific integrated circuit a selection of one of a plurality of supported full reference, perception-based objective video quality metrics; and
    simultaneously computing at a processing unit of the application-specific integrated circuit a plurality of video quality metrics in parallel including the selected one of the plurality of supported full reference, perception-based objective video quality metrics for the distorted frame with respect to the reference frame and a no reference video quality metric for the reference frame that indicates source quality prior to transcoding by determining pixel spread from computing pixel edge width values.

16. The method of claim 15, wherein the processing unit is configured to simultaneously compute a Peak Signal-to-Noise Ratio (PSNR) metric for the distorted frame with respect to the reference frame in parallel.

17. The method of claim 15, wherein the no reference video quality metric comprises a blurriness metric of the reference frame.

18. A computer program product embodied in a non-transitory computer readable medium and comprising computer instructions for:
    receiving data from a buffer memory of an application-specific integrated circuit comprising at least a portion of a reference frame of a video and at least a corresponding portion of a distorted frame of a transcoded version of the video;
    receiving from a programming interface of the application-specific integrated circuit a selection of one of a plurality of supported full reference, perception-based objective video quality metrics; and
    simultaneously computing at a processing unit of the application-specific integrated circuit a plurality of video quality metrics in parallel including the selected one of the plurality of supported full reference, perception-based objective video quality metrics for the distorted frame with respect to the reference frame and a no reference video quality metric for the reference frame that indicates source quality prior to transcoding by determining pixel spread from computing pixel edge width values.

19. The computer program product of claim 18, wherein the processing unit is configured to simultaneously compute a Peak Signal-to-Noise Ratio (PSNR) metric for the distorted frame with respect to the reference frame in parallel.

20. The computer program product of claim 18, wherein the no reference video quality metric comprises a blurriness metric of the reference frame.

* * * * *